United States Patent [19]
McNamara et al.

[11] Patent Number: 5,803,417
[45] Date of Patent: Sep. 8, 1998

[54] PORTABLE APPARATUS FOR SUPPORTING A SINK

[76] Inventors: James E. McNamara, 521 Reading Dr.; Joseph A. Gibson, 1722 Lexington Ave., both of Springfield, Ohio 45505

[21] Appl. No.: 796,895

[22] Filed: Feb. 6, 1997

[51] Int. Cl.⁶ .................................................. A47G 23/02
[52] U.S. Cl. ................ 248/149; 297/188.21; 297/188.2; 297/156
[58] Field of Search .......................... 297/188.01, 188.2, 297/188.21, 195.11, 195.1, 135, 170, 440.1, 440.13, 440.24, 452.2, 156; 248/146, 149, 150, 154

[56] References Cited

U.S. PATENT DOCUMENTS

| | | |
|---|---|---|
| 653,986 | 7/1900 | Conderman . |
| 885,594 | 4/1908 | Foster ................................. 297/188.21 |
| 2,035,301 | 3/1936 | Daugherty ............................... 248/274 |
| 2,188,433 | 1/1940 | Friese .......................................... 29/89 |
| 2,576,660 | 11/1951 | Williams ................................... 212/64 |
| 3,359,928 | 12/1967 | Gamble .............................. 297/188.01 |
| 3,363,939 | 1/1968 | Gross .................................. 297/188.01 |
| 3,667,773 | 6/1972 | Hess .................................... 297/188.01 |
| 4,659,072 | 4/1987 | De La Rosa .............................. 269/17 |
| 5,538,206 | 7/1996 | Sather .................................... 248/27.1 |
| 5,653,499 | 8/1997 | Goodall .................................. 297/170 |

*Primary Examiner*—Milton Nelson, Jr.
*Attorney, Agent, or Firm*—Biebel & French

[57] ABSTRACT

An apparatus for supporting a sink having a laterally extending peripheral flange. The apparatus includes an elongated horizonal support bar and a pair of sink support members supported on a support bar in spaced relation to each other. Each of the sink support members includes an engagement portion for engaging the support bar and a bifurcated arm portion extending from the engagement portion for receiving the peripheral flange of the sink therebetween. The engagement portion of each of the sink support members is selectively movable to a plurality of lateral locations along the support bar to adjust the spacing between the pair of sink support members.

19 Claims, 5 Drawing Sheets

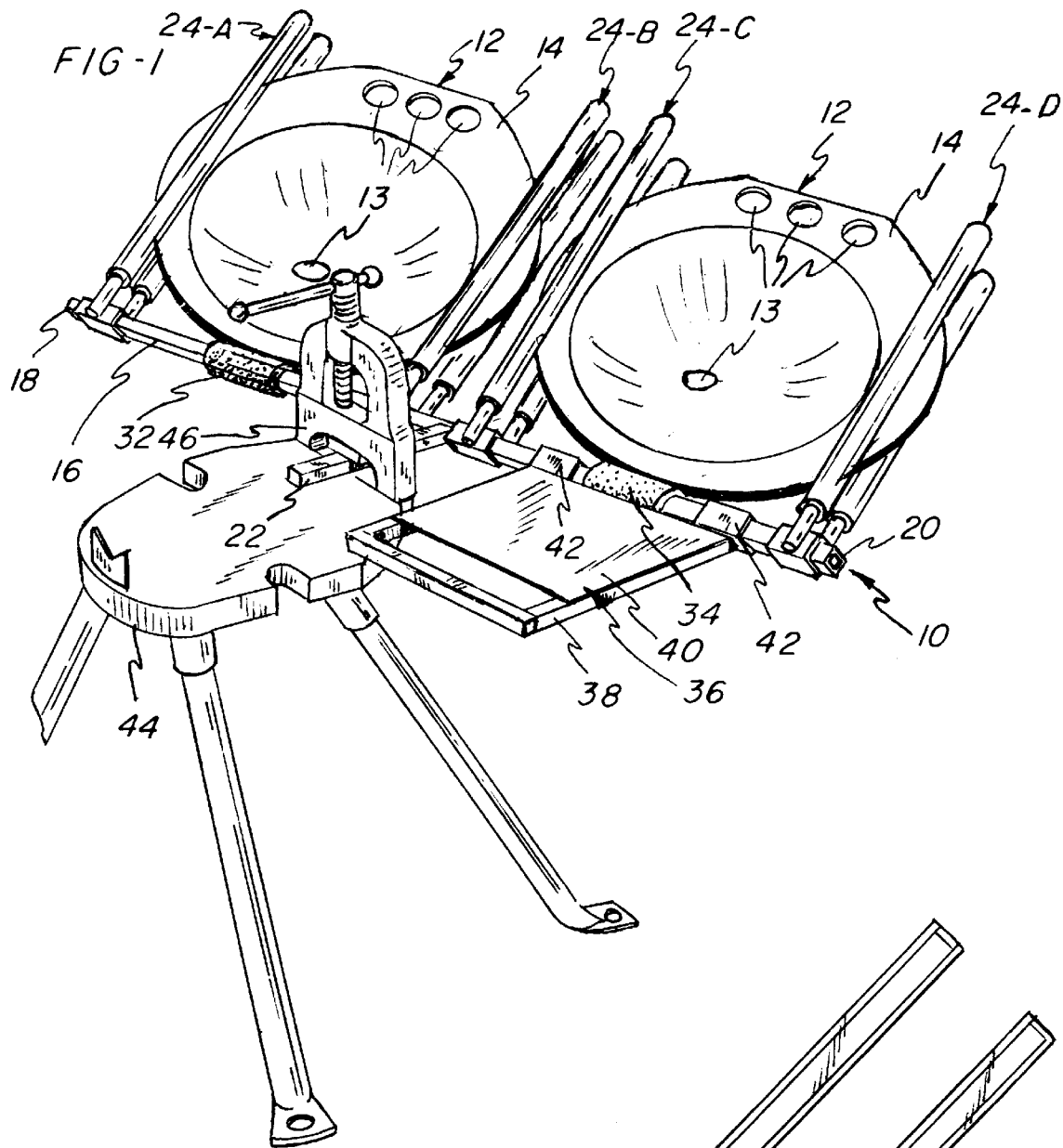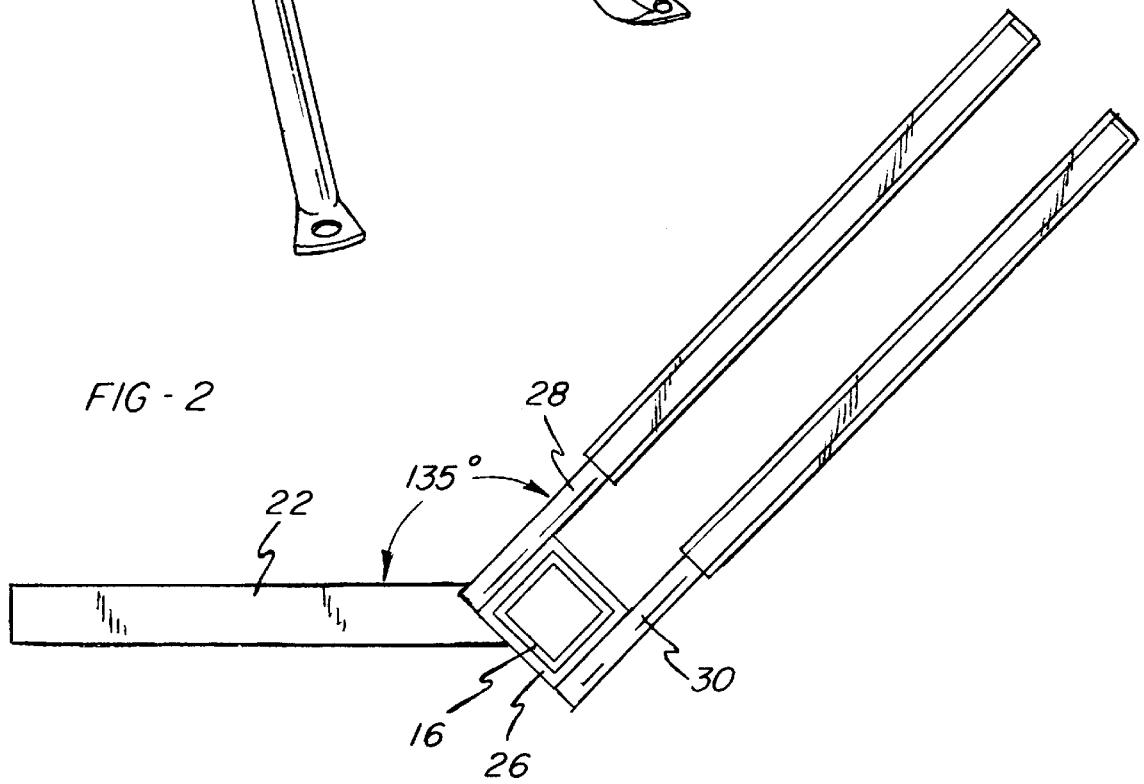

PORTABLE APPARATUS FOR SUPPORTING A SINK

BACKGROUND OF THE INVENTION

The present invention relates to portable supports and, more particularly, to a portable support for supporting sinks to allow a worker to operate on the sinks prior to installation of the sinks.

During installation of sinks, such as sinks adapted to be mounted into cabinets in a house, a worker will typically mount plumbing fixtures to the sink prior to installation of the sink into a cabinet. In the past, it has been a common practice to support the sink on a floor surface during fixture installation. However, this practice can result in the inadvertant chipping or scratching of the sink surfaces as a result of the sink being supported in an unrestrained manner on the floor surface.

In addition, the worker installing the fixtures on the sink must either lean over or otherwise descend to the level of the sink adjacent to the floor. Such a practice has proven to cause excess fatigue, and is also inconvenient with regard to efficiently accessing the work area. In addition, this practice has proven to be extremely tedious and fatiguing in the case where a large number of sinks must be prepared for installation.

Accordingly, there is a need for a support for holding sinks during installation of plumbing fixtures. In particular, there is a need for a sink support which may be easily transported to a job site and which is adapted to hold sinks at a convenient height, while protecting the sinks against damage, during placement of plumbing fixtures into the sinks prior to installation of the sinks.

SUMMARY OF THE INVENTION

The present invention is directed to an apparatus for supporting a sink of the type having a laterally extending peripheral flange portion. Such sinks typically include a drain hole and one or more holes located at the flange portion for receiving plumbing fixtures.

The apparatus of the present invention is adapted to support sinks at an elevated position and may be used in combination with a vice, such as a portable tri-stand yoke vice, or other type of vice, commonly used by plumbers at job sites. The apparatus includes an elongated horizontal support bar, and a mounting bar rigidly attached to the support bar substantially centrally between opposing ends of the support bar. The mounting bar is adapted to be fastened within a vice in order to positively position the support bar at a desired elevated location.

The support bar is adapted to support two sinks simultaneously, one on each side of the mounting bar. The sinks are each supported by a pair of sink support members wherein each sink support member includes an engagement portion for engaging the support bar and a bifurcated arm portion extending from the engagement portion. The bifurcated arm portion of each sink support member includes a pair of spaced, substantially straight arm members extending in parallel relation to each other for receiving the peripheral flange portion of a sink therebetween. The engagement portion of each of the sink support members is selectively moveable to a plurality of lateral locations along the support bar in order to adjust the spacing between the pairs of sink support members.

In addition, a work table is also preferably supported on the support bar. The work table includes an engagement portion, or a pair of engagement portions, similar to the engagement portions of the sink support members. Thus, the work table may be detachably supported on the support bar, and is provided to conveniently hold tools, supplies and plumbing fixtures for use in preparing sinks for installation.

Therefore, it is an object of the present invention to provide a readily portable support for sinks.

It is a further object of the invention to provide a support for sinks whereby the sinks may be held at a convenient height.

It is yet another object of the invention to provide a support for sinks which may be adjusted to accommodate sinks having different widths.

Other objects and advantages of the invention will be apparent from the following description, the accompanying drawings and the appended claims.

BRIEF DESCRIPTION OF THE DRAWINGS

FIG. 1 is a perspective view of the apparatus of the present invention in use for supporting sinks;

FIG. 2 is a side elevational view of the apparatus;

DETAILED DESCRIPTION OF THE PREFERRED EMBODIMENT

Referring to FIG. 1, the present invention comprises an apparatus 10 for supporting sinks 12 having laterally extending peripheral flange portions 14. A plurality of apertures 13 are typically formed in the sinks 12 for receiving plumbing fixtures such as drains and faucets (not shown) which are attached by accessing both the upper and lower areas of the sinks 12.

Figure 3:
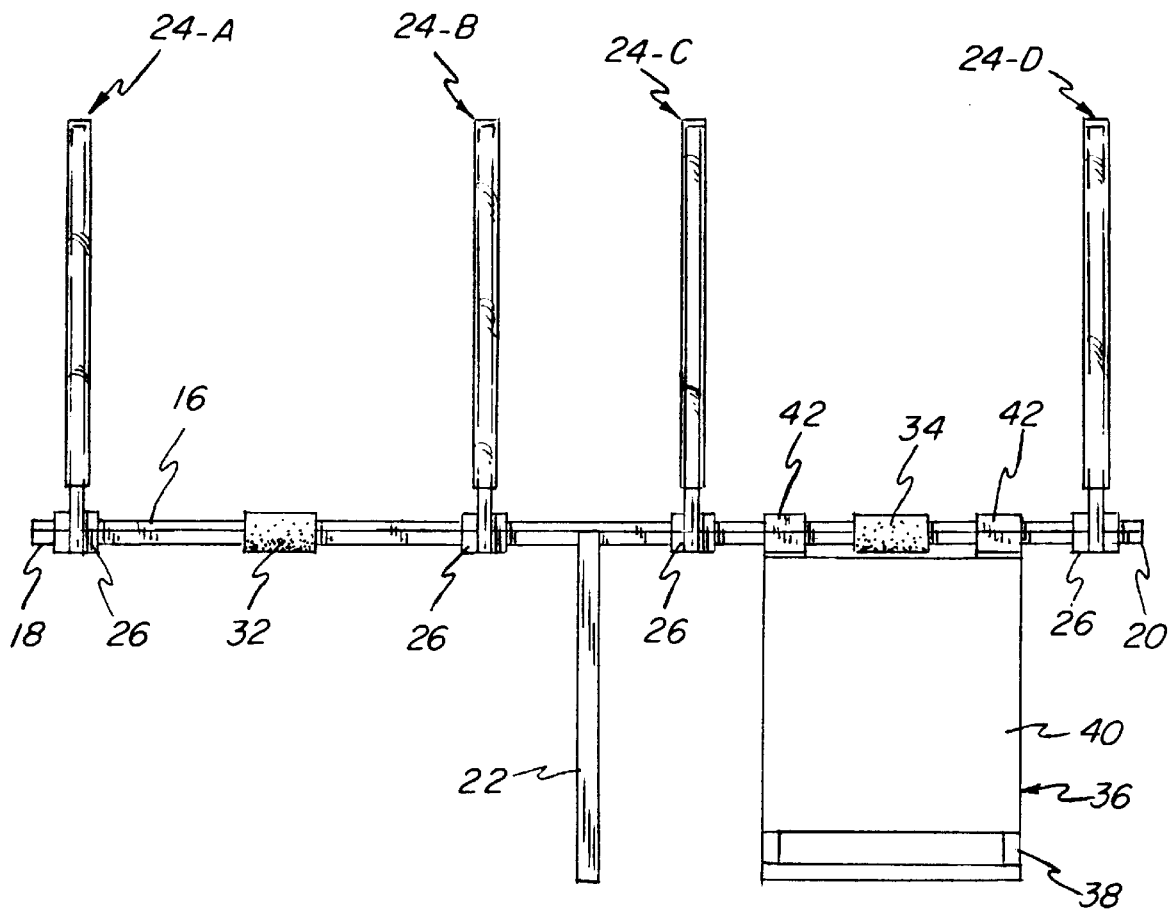
FIG. 3 is a top plan view of the apparatus.
Figure 4:
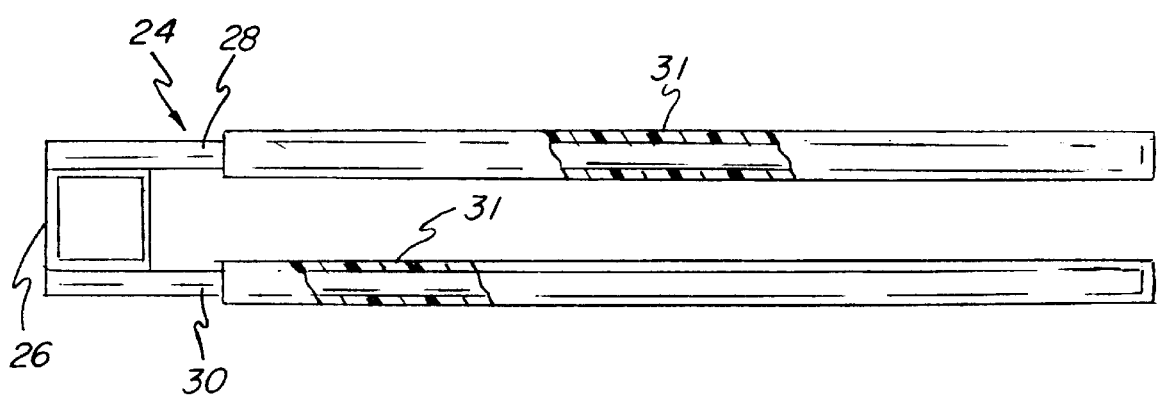
FIG. 4 is a side elevational view of a sink support member for the apparatus.

Referring further to FIGS. 2–4, the sink supporting apparatus 10 includes an elongated horizontal support bar 16 having opposing ends 18, 20. The support bar 16 is preferably formed of channel material having four flat sides defining a square cross section for the support bar 16. A mounting bar 22 is rigidly attached to the support bar 16 substantially centrally between the opposing ends 18, 20 and extending perpendicular relative to the support bar 16. The mounting bar 22 is formed of a square channel material similar to that of the support bar 16 and extends at an obtuse angle relative to at least two of the flat sides of the support bar 16. Specifically, the mounting bar 22 is preferably attached to the support bar 16 at a right angle junction between two of the support bar sides wherein the support bar sides are oriented at an angle of approximately 135°.

A plurality of sink support members 24A–D are supported on the support bar 16 in spaced relation to each other. The pair of sink support members 24-A and 24-B are located between the mounting bar 22 and the end 18 of the supported bar 16 in predetermined spaced relation relative to each other to support a sink 12 therebetween. Similarly, the pair of sink support members 24-C and 24-D are located between the mounting bar 22 and the end 20 at a predetermined spacing to support a further sink 12 therebetween.

Each sink support member 24A–D includes an engagement portion 26 for engaging the support bar 16, and a bifurcated arm portion comprising a pair of spaced, substantially straight arm members 28, 30 extending from the engagement portion 26. The arms 28, 30 are spaced approximately 1½ inches apart to receive the peripheral flange portion 14 of a sink therebetween. In addition, it should be noted that the arm members 28, 30, which are typically formed of metal bar material, are preferably covered with a soft covering 31 to avoid damaging the exterior surface of the sinks 12. For example, the arm members 28, 30 may be covered with a plastic tubing material, such as butal tubing. Further, soft covering members 32, 34 are also provided on the support bar 16 to form a cushion between the edges of the sinks 12 and the support bar 16. The covering members 32, 34 are preferably slidably supported on the support bar 16 to permit adjustment of the lateral positions of the covering members 32, 34.

In the present embodiment, the engagement portion 26, comprises a sleeve having a square cross section cooperating with the squares cross section of the support bar 16 wherein the non-circular configuration of the sleeve and bar 16 prevents relative rotation between these members. The internal area of the engagement portion 26 is slightly larger than the cross sectional area of the support bar 16 whereby the sink support members 24A–D may be conveniently slidably positioned to a plurality of locations along the support bar 16, depending on the width dimensions of the sinks to be supported.

A work table 36 may also be provided, supported on the support bar 16. The work table 36 includes a frame 38 supporting a horizontal work surface 40. The work frame 38 is attached to a pair of sleeves 42 similar to the sleeves forming the engagement portions 26 of the sink support arms 24A–D. The work table 36 provides a convenient surface for supporting tools, supplies and fixtures for use in preparing the sinks 12 for installation.

As seen in FIG. 1, the sink support apparatus 10 of the present invention is adapted to be used in combination with a support structure, such as a portable tri-stand 44 having a vice 46 supported thereon. The mounting bar 22 is adapted to be gripped and held in the vice 46 in a horizontal position whereby the support bar 16 and work table 36 are held in horizonal working positions. In addition, the sink support members 24A–D are angled upwardly at an angle of approximately 45° relative to the horizontal. In this position, a pair of sinks 12 may be slid downwardly from the open ends of the support members 24A–D toward the support bar 16 where they will be supported at an elevated position permitting installation of attachments without the risk of damage to the sink surfaces.

Figure 5:
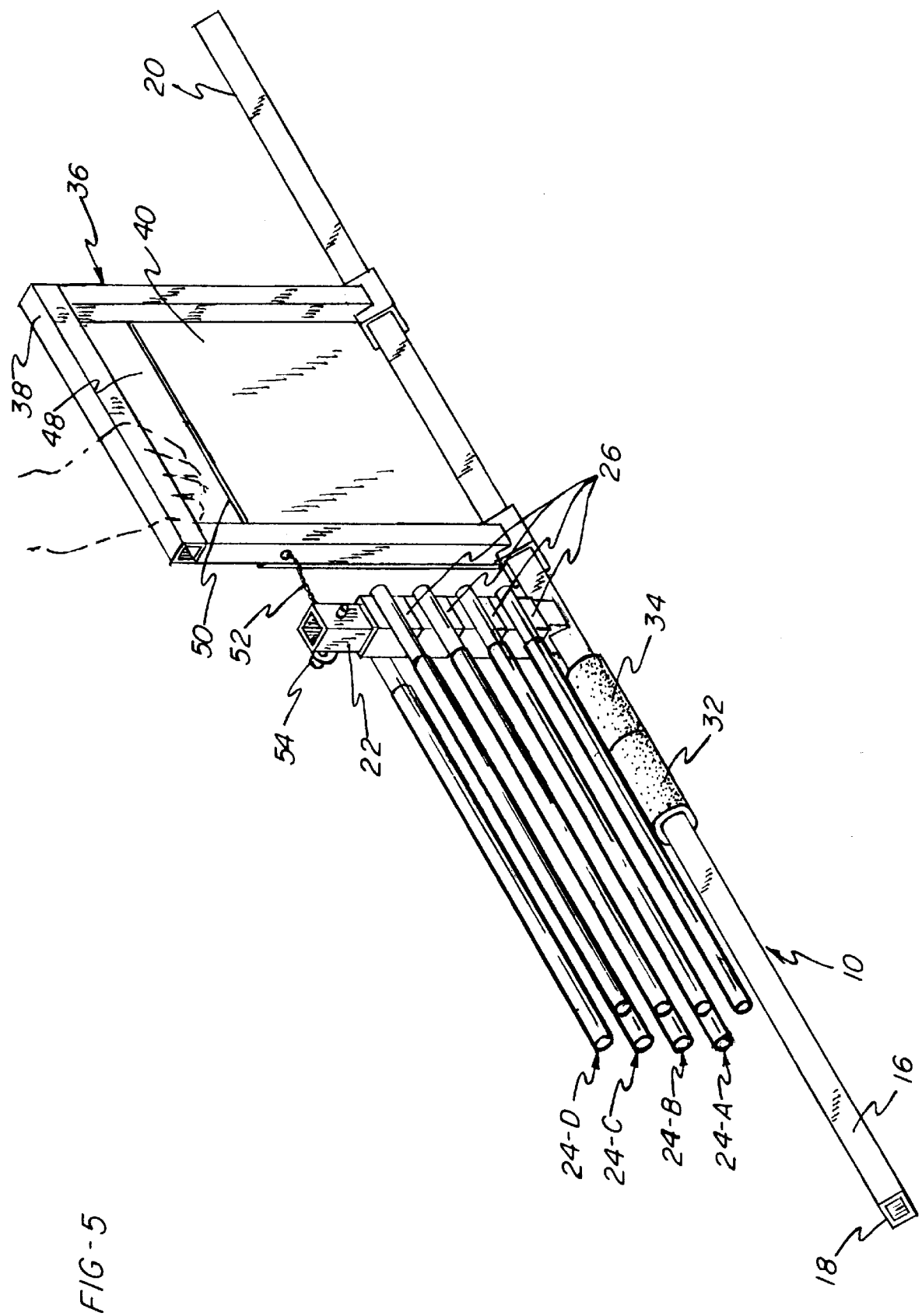
FIG. 5 is a perspective view of the apparatus configured for transportation.

Referring to FIG. 5, a carrying mode of operation for the apparatus 10 is illustrated. In particular, it can be seen that the support members 24A–D have been removed from the support bar 16, and the engagement portions 26 have been slidably assembled onto the mounting bar 22 with the bifurcated arm portions extending toward one end 18 of the support bar 16. In addition, the work table 36 has been positioend between the mounting bar 22 and the end 20 of the support bar 16 with the table 36 extending parallel to the mounting bar 22. The table 36 includes an open area 48 between an end of the frame 38 and an edge 50 of the work surface 40 wherein the open area 48 defines a handle area whereby a person may carry the apparatus 10 to a desired location for use.

It should also be noted that in the preferred embodiment, a chain 52 is provided attached to the frame 38 and extending to a removable pin 54 which is positioned through aligend apertures formed through the mounting bar 22. The chain 52 prevents the table 36 from sliding away from the center of the support bar 16 when the apparatus 10 is being transported. In addition, the pin 54 prevents the sink support members 24 from being removed from the mounting bar 22 during transport of the apparatus 10.

Figure 6:
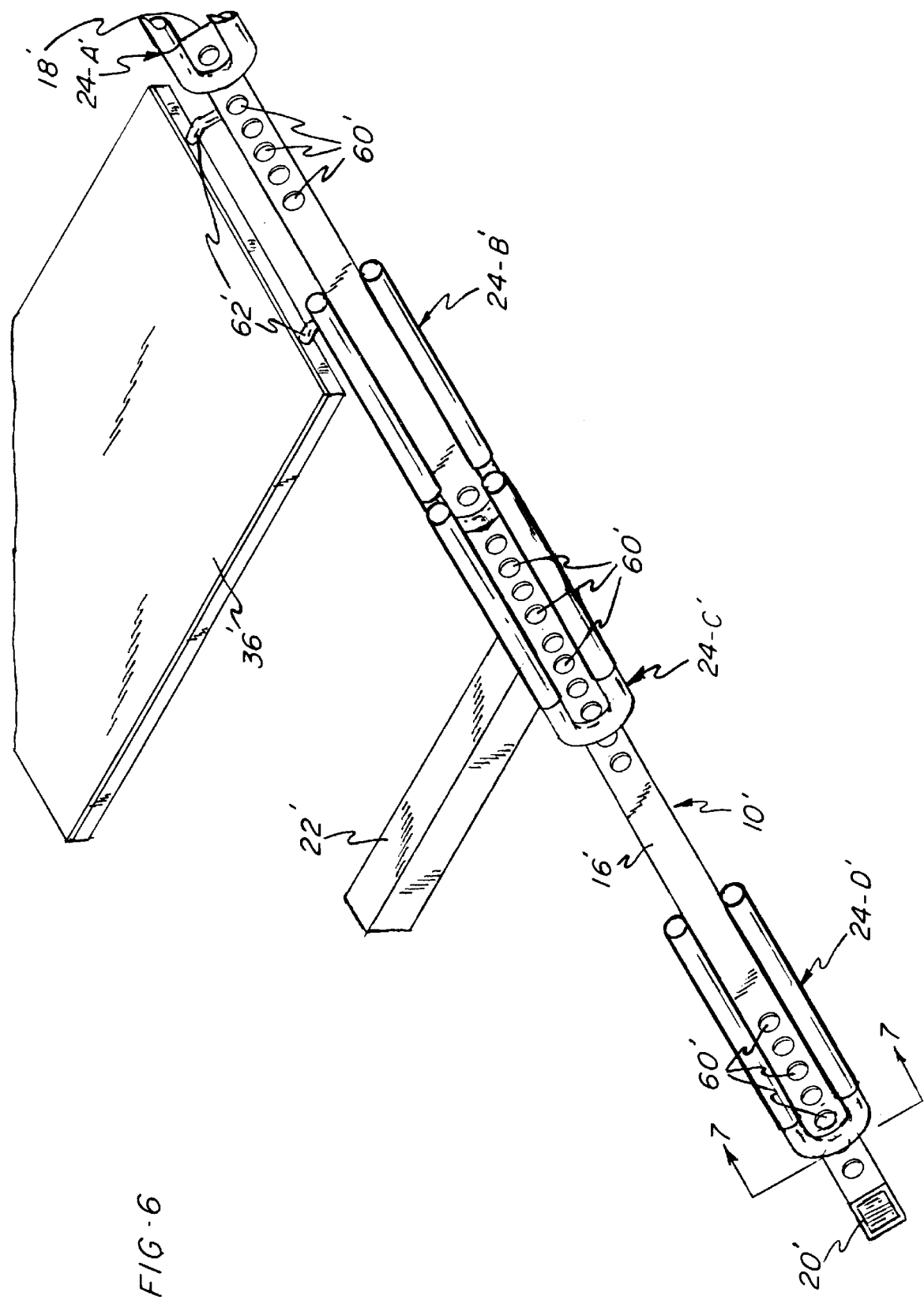
FIG. 6 is a perspective view of an alternative embodiment of the apparatus.
Figure 7:
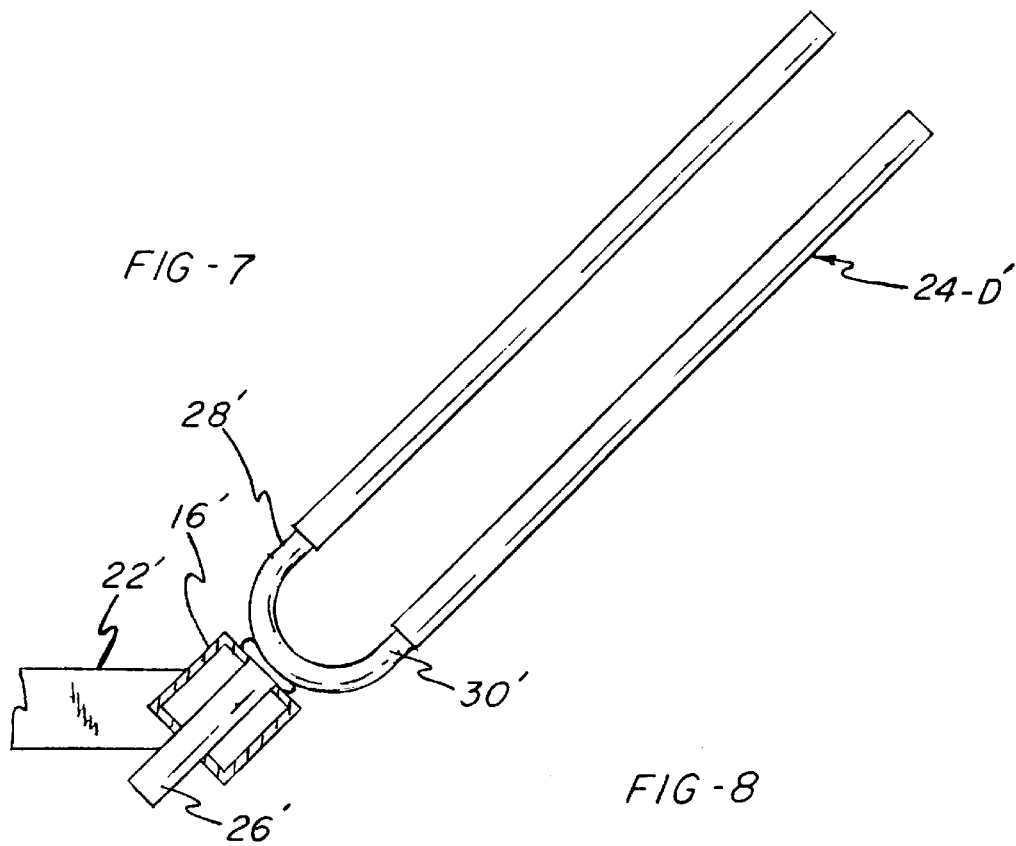
FIG. 7 is a cross-sectional view taken along line 7—7 in FIG. 6.
Figure 8:
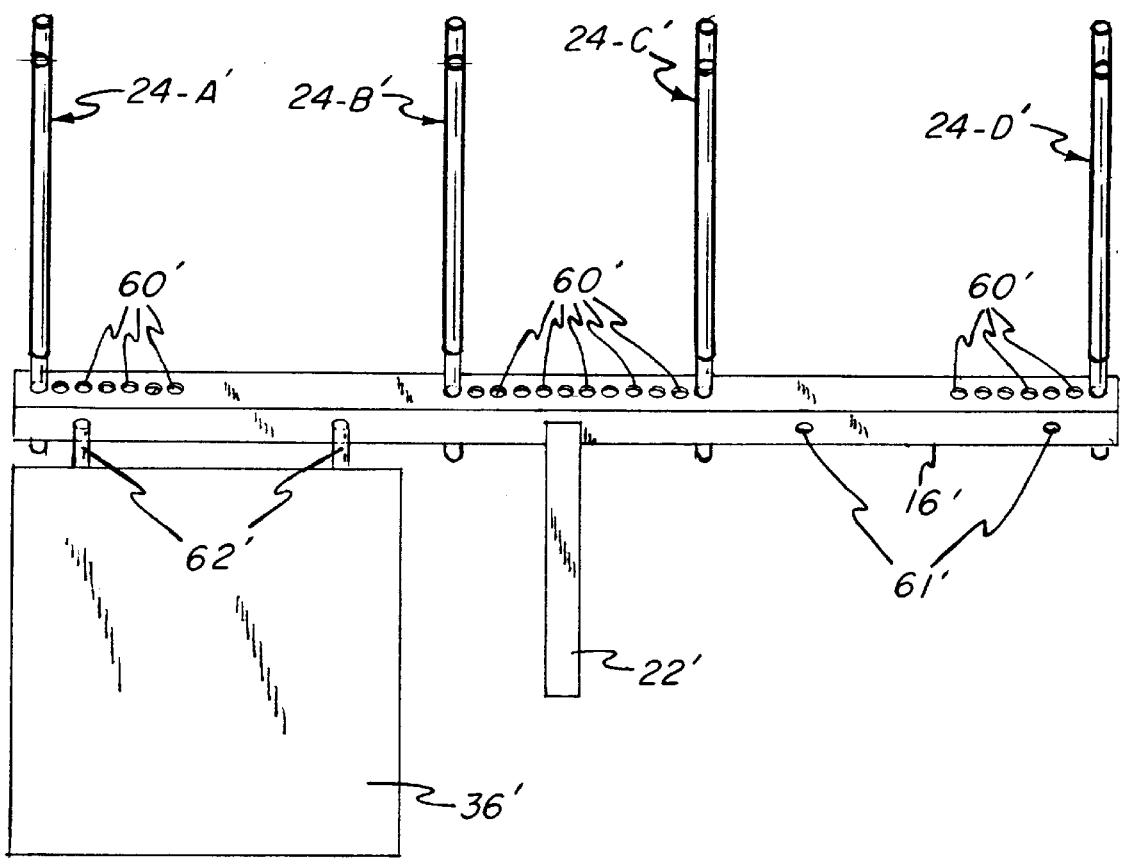
FIG. 8 is a top plan view of the apparatus of FIG. 6.

Referring to FIGS. 6–8, a second embodiment of the invention is illustrated wherein elements corresponding to elements in the first embodiment are identified with the same reference numeral primed. Further, the construction of the apparatus 10 of the second embodiment is substantially identical to the first embodiment with the exception of the engagement portions for attaching the sink support members and work table to the support bar.

In the present embodiment, the engagement portion 26' is formed by a rod member which is adapted to be received in one of a plurality of apertures 60' defined through opposed parallel sides of the support bar 16'. The apertures 60' are preferably located on 1 inch centers adjacent to the ends 18', 20' and the center of the support bar 16', and provide a plurality of locations for positioning the sink support members 24A'–D'. The apertures 60' orient the sink support members 24A'–D' at an angle of approximately 45° relative to the horizontal, as in the previous embodiment.

In addition, pairs of aligned apertures 61' are provided in opposing sides of the support bar 16' for receiving support rods 62' to support a work table 36' in a horizontal position parallel to the mounting bar 22'. As seen in FIG. 8, a set of apertures 61' is provided in support bar 16' on either side of the mounting bar 22' to provide two alternative mounting points for the work table 36'.

Accordingly, the apparatus 10' of the present embodiment operates in substantially the same manner of the previous embodiment to support sinks. In particular, the mounting bar 22' may be engaged in a vice whereby the sink support members are oriented extending upwardly to receive sinks between the pairs of members 24-A', 24-B' and 24-C', 24-D'. It should be noted that in addition to supporting a pair of sinks, the above described embodiments of the present invention is equally adapted to support a single large, double basin sink. In such a use of the apparatus, a single pair of the sink support arms would be utilized, each sink support arm being located adjacent to either end of the support bar.

From the above described embodiments, it should be apparent that the present invention provides an easily transported support apparatus for sinks. Further, the present apparatus is adapted to position sinks at a convenient height for workers to operate on the sinks prior to installation, and further provides a means for protecting sinks against damage prior to installation.

While the forms of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for supporting a sink having a laterally extending peripheral flange portion, said apparatus comprising:

an elongated horizontal support bar;

a pair of sink support members supported on said support bar in spaced relation to each other;

each said sink support member comprising an engagement portion for engaging said support bar and a bifurcated arm portion extending from said engagement portion and comprising a pair of spaced arm members for receiving a peripheral flange portion of a sink therebetween; and said engagement portion of each said sink support member and said support bar including cooperating means releasably holding said support members to said support bar whereby said support members are selectively movable to a plurality of lateral locations along said support bar to adjust the spacing between said pair of sink support members.

2. The apparatus of claim 1 including a mounting bar rigidly attached to said support bar and extending perpendicular relative to said support bar.

3. The apparatus of claim 1 wherein said support bar includes a plurality of laterally spaced apertures and said engagement portion comprises a rod member inserted into one of said apertures.

4. The apparatus of claim 1 including a horizontal table supported on said support bar.

5. The apparatus of claim 1 wherein said pair of spaced arm members comprise first and second substantially straight members extending in parallel relation to each other.

6. The apparatus of claim 1 wherein said engagement portion comprises a sleeve positioned around said support bar, said sleeve being slidable along said support bar whereby said engagement portion is movable to said plurality of lateral locations.

7. The apparatus of claim 6 wherein said sleeve and said support bar are formed with a cooperating non-circular cross sectional shape.

8. The apparatus of claim 1 wherein said support bar includes four generally flat sides connected together at right angle junctions to define a square cross section.

9. The apparatus of claim 8 including a mounting bar rigidly attached to said support bar at one of said right angle junctions, said mounting bar defining a longitudinal axis extending at an obtuse angle relative to at least two of said flat sides.

10. The apparatus of claim 9 wherein said obtuse angle is approximately 135 degrees.

11. An apparatus for supporting a sink having a laterally extending peripheral flange portion, said apparatus comprising:

an elongated horizontal support bar having opposing ends;

a mounting bar rigidly attached to said support bar substantially centrally between said ends and extending perpendicular relative to said support bar;

a pair of sink support members supported on said support bar in spaced relation to each other;

each said sink support member comprising an engagement portion for engaging said support bar and a bifurcated arm portion extending from said engagement portion and comprising a pair of spaced, substantially straight arm members extending in parallel relation to each other for receiving a peripheral flange portion of a sink therebetween; and said engagement portion of each said sink support member and said support bar including cooperating means releasably holding said support members to said support bar whereby said support members are selectively movable to a plurality of lateral locations along said support bar to adjust the spacing between said pair of sink support members.

12. The apparatus of claim 11 wherein said mounting bar defines a longitudinal axis extending at an angle of approximately 135 degrees relative to said arm members.

13. The apparatus of claim 11 wherein said support bar includes a plurality of laterally spaced apertures and said engagement portion comprises a rod member inserted into one of said apertures.

14. The apparatus of claim 11 including a horizontal table supported on said support bar.

15. The apparatus of claim 11 wherein said engagement portion comprises a sleeve positioned around said support bar, said sleeve being slidable along said support bar whereby said engagement portion is movable to said plurality of lateral locations.

16. The apparatus of claim 15 wherein said sleeve and said support bar are formed with a cooperating non-circular cross sectional shape.

17. An apparatus for supporting a sink having a laterally extending peripheral flange portion, said apparatus comprising:

an elongated horizontal support bar having opposing ends, said support bar including four flat sides defining a square cross section;

a mounting bar rigidly attached to said support bar substantially centrally between said ends and extending perpendicular relative to said support bar, said mounting bar extending at an obtuse angle relative to at least two of said flat sides;

a pair of sink support members supported on said support bar in spaced relation to each other;

each said sink support member comprising an engagement portion for engaging said support bar and a bifurcated arm portion extending from said engagement portion and comprising a pair of spaced, substantially straight arm members extending in parallel relation to each other for receiving a peripheral flange portion of a sink therebetween; and said engagement portion of each said sink support member and said support bar including cooperating means releasably holding said support members to said support bar whereby said support members are selectively movable to a plurality of lateral locations along said support bar to adjust the spacing between said pair of sink support members.

18. The apparatus of claim 17 wherein said engagement portion comprises a sleeve positioned around said support bar, said sleeve being slidable along said support bar whereby said engagement portion is movable to said plurality of lateral locations.

19. The apparatus of claim 17 wherein said support bar includes a plurality of laterally spaced apertures and said engagement portion comprises a rod member inserted into one of said apertures.

* * * * *